(12) United States Patent
Baker et al.

(10) Patent No.: US 8,519,846 B2
(45) Date of Patent: Aug. 27, 2013

(54) TRACKING SYSTEM FOR GAMMA RADIATION STERILIZED BAGS AND DISPOSABLE ITEMS

(75) Inventors: Kenneth D. Baker, Ambler, PA (US); Jeffrey Johnson, Chalfont, PA (US); Gary Rozenblat, Sherman Oaks, CA (US); George Younan, Porter Ranch, CA (US); Michael C. Needling, Norristown, PA (US); David Greer, Perkasie, PA (US)

(73) Assignee: NewAge Industries, Inc., Southampton, PA (US)

( * ) Notice: Subject to any disclaimer, the term of this patent is extended or adjusted under 35 U.S.C. 154(b) by 77 days.

(21) Appl. No.: 11/829,189

(22) Filed: Jul. 27, 2007

(65) Prior Publication Data

US 2008/0024310 A1  Jan. 31, 2008

Related U.S. Application Data

(63) Continuation-in-part of application No. 11/742,844, filed on May 1, 2007, which is a continuation of application No. 11/082,086, filed on Mar. 16, 2005, now Pat. No. 7,259,675.

(60) Provisional application No. 60/553,511, filed on Mar. 16, 2004, provisional application No. 60/921,924, filed on Apr. 4, 2007, provisional application No. 60/862,654, filed on Oct. 24, 2006.

(51) Int. Cl.
  *G08B 13/14* (2006.01)
  *H01L 21/00* (2006.01)
(52) U.S. Cl.
  USPC ............. 340/572.1; 438/3; 438/57; 257/421; 422/22; 340/539.29; 340/539.1

(58) Field of Classification Search
  USPC .................... 340/572.1, 539.29, 539.26, 506, 340/539.1; 426/212; 422/21, 22, 23, 24, 422/186; 235/385; 257/421; 438/3, 57
  See application file for complete search history.

(56) References Cited

U.S. PATENT DOCUMENTS

| 3,961,323 A | 6/1976 | Hartkorn |
| 4,694,283 A | 9/1987 | Reeb |

(Continued)

FOREIGN PATENT DOCUMENTS

| EP | 1145189 | 5/2008 |
| EP | 1887581 | 12/2008 |

(Continued)

OTHER PUBLICATIONS

Ramtron Serial FRAM Heavy Ion Test (Nov. 1998).

(Continued)

*Primary Examiner* — Hoi Lau
(74) *Attorney, Agent, or Firm* — Volpe and Koenig, P.C.

(57) ABSTRACT

A tracking system for items to be ionizing radiation sterilized is provided which utilizes an attached RF ID tag that is ionizing radiation proof or enclosed in an ionizing radiation proof holder. The RF ID tag is coded with a unique identification and certification data on the ionizing radiation sterilization. An RF ID tag reader is provided, which is usable by a user to obtain the identification and sterilization data from the RF ID tag on the item. The RF ID tag reader includes a user input for at least one trackable event and can write data based on the at least one trackable event back onto the RF ID tag. The RF ID tag reader is at least one of connectable to a PC or the internet, or is compatible for uploading the identification and any user input to an internet accessible device. A database is provided, having item related information. The database provides access to a user to obtain related information based on the identification from the RF ID tag and receives and stores data related to the at least one trackable event.

23 Claims, 6 Drawing Sheets

(56) References Cited

U.S. PATENT DOCUMENTS

| | | | |
|---|---|---|---|
| 5,360,437 A | 11/1994 | Thompson | |
| 5,484,549 A | 1/1996 | Hei et al. | |
| 5,661,310 A * | 8/1997 | Jones | 250/584 |
| 5,790,029 A | 8/1998 | Curnutte et al. | |
| 5,866,907 A | 2/1999 | Drukier et al. | |
| 5,892,706 A | 4/1999 | Shimizu et al. | |
| 5,910,776 A | 6/1999 | Black | |
| 5,923,001 A | 7/1999 | Morris et al. | |
| 6,140,139 A | 10/2000 | Lienau et al. | |
| 6,222,453 B1 | 4/2001 | Joyce | |
| 6,340,931 B1 | 1/2002 | Harrison et al. | |
| 6,366,206 B1 | 4/2002 | Ishikawa et al. | |
| 6,376,845 B1 * | 4/2002 | Purtle | 250/491.1 |
| 6,617,963 B1 | 9/2003 | Watters et al. | |
| 6,649,829 B2 | 11/2003 | Garber et al. | |
| 6,660,396 B1 | 12/2003 | Warburton-Pitt | |
| 6,717,154 B2 | 4/2004 | Black et al. | |
| 6,795,339 B2 | 9/2004 | Ooishi | |
| 6,802,416 B1 * | 10/2004 | D'Alessio et al. | 206/229 |
| 6,936,160 B2 | 8/2005 | Moscaritolo et al. | |
| 6,994,253 B2 | 2/2006 | Miller et al. | |
| 7,106,202 B2 | 9/2006 | Dickinson | |
| 7,207,154 B2 | 4/2007 | Araujo | |
| 7,304,573 B2 | 12/2007 | Postma | |
| 2001/0007532 A1 | 7/2001 | Sato et al. | |
| 2001/0033233 A1 | 10/2001 | Jentsch et al. | |
| 2002/0076819 A1 | 6/2002 | Bowman et al. | |
| 2002/0100547 A1 * | 8/2002 | Takahashi et al. | 156/289 |
| 2002/0143320 A1 | 10/2002 | Levin | |
| 2003/0043039 A1 | 3/2003 | Salemi et al. | |
| 2003/0072676 A1 * | 4/2003 | Fletcher-Haynes et al. | 422/23 |
| 2003/0158795 A1 | 8/2003 | Markham et al. | |
| 2003/0160698 A1 | 8/2003 | Andreasson et al. | |
| 2003/0164401 A1 | 9/2003 | Andreasson et al. | |
| 2003/0174046 A1 | 9/2003 | Abrams | |
| 2003/0183699 A1 | 10/2003 | Masui | |
| 2004/0027243 A1 * | 2/2004 | Carrender | 340/568.1 |
| 2004/0070504 A1 | 4/2004 | Brollier et al. | |
| 2004/0132368 A1 | 7/2004 | Price et al. | |
| 2004/0173456 A1 | 9/2004 | Boos et al. | |
| 2004/0264243 A1 * | 12/2004 | Lienau et al. | 365/171 |
| 2005/0030160 A1 * | 2/2005 | Goren et al. | 340/10.5 |
| 2005/0248454 A1 * | 11/2005 | Hanson et al. | 340/539.26 |
| 2006/0016897 A1 | 1/2006 | Yasuda et al. | |
| 2006/0092013 A1 * | 5/2006 | Hager et al. | 340/539.1 |
| 2006/0109118 A1 * | 5/2006 | Pelo et al. | 340/572.1 |
| 2006/0139175 A1 | 6/2006 | Cosier | |
| 2006/0214791 A1 * | 9/2006 | Tethrake et al. | 340/572.1 |
| 2007/0171076 A1 * | 7/2007 | Stevens et al. | 340/572.8 |
| 2007/0217717 A1 | 9/2007 | Murray | |
| 2007/0262867 A1 * | 11/2007 | Westrick et al. | 340/572.7 |
| 2008/0024305 A1 | 1/2008 | Deavours | |
| 2008/0042837 A1 * | 2/2008 | Burke | 340/572.1 |
| 2008/0106419 A1 * | 5/2008 | Sakama et al. | 340/572.7 |
| 2008/0137399 A1 | 6/2008 | Chan et al. | |
| 2008/0296373 A1 * | 12/2008 | Zmood et al. | 235/385 |
| 2008/0308747 A1 * | 12/2008 | Gordon et al. | 250/472.1 |
| 2009/0204250 A1 * | 8/2009 | Potyrailo et al. | 700/109 |

FOREIGN PATENT DOCUMENTS

| | | |
|---|---|---|
| GB | 1325961 | 8/1973 |
| GB | 1527341 | 10/1978 |
| GB | 2303082 | 2/1997 |
| JP | 11297963 | 1/1999 |
| JP | 2003243631 | 8/2003 |
| JP | 200639773 | 2/2006 |
| WO | 0108106 | 2/2001 |
| WO | 0147466 | 7/2001 |
| WO | 02095675 | 11/2002 |
| WO | 2004028631 | 4/2004 |
| WO | 2005089402 | 9/2005 |
| WO | 2006041965 | 4/2006 |

OTHER PUBLICATIONS

Advantages of the FM24C16 Serial 16Kb FRAM Memory, Ramtron (Jan. 1999).
Reliability of Ferroelectric Memory for High-Rel and Space Applications (Oct. 1999).
Radiation Response of Emerging FeRAM Technology (Nov. 2001).
Reliability and Endurance of FRAM: A Case Study (Nov. 4, 2002).
Memories: Radiation Test Results (Apr. 2005).
Total Dose Radiation Tests at FRAM Non-Volatile Memories (Apr. 2005).
The Endurance Performance 0.5 mm FRAM Products (May 2005).
InfoChip Systems, Inc. "Industrial Asset Management for the 21st Century" (Mar. 12, 2002).
Opus World Solutions from Microlise "RFID Tagging Technology" (Jan. 3, 2003).
RF Saw, Inc. Announces Gamma Radiation Hard RFID Tags; Doses up to 5 Mega Reds—500 Million Ergs/GM—With No Measurable Degradation, Business Wire, Dec. 10, 2003, Gale Group, Richardson, Texas.
Global Sources, EE Times India, RFID Tag with 256 Bytes of FRAM, Aug. 12, 2005.
Could Saw RFID Tags Serve Health Care?, Patient Safety, Apr. 26, 2006.
"Asset Management for the 21st Century", InfoChip Systems, Inc., Jan. 27, 2004, pp. 1-9, http://replay.waybackmachine.org/20040127055025/http://www.infochip.com, retrieved Mar. 10, 2011.
OPUSWORLD: "RFID Tagging Technology", Brochure Microlise, Jan. 3, 2003, pp. 1-8.
"A Study of Radiation Vulnerability of Ferroelectric Material and Devices", Cole et al. IEEE Transactions on Nuclear Science, vol. 41, No. 3, Jun. 1994. (Best available copy).
Scott, et al., Radiation Effects on Ferroelectric Thin-Film Memories: Retention Failure Mechanisms, J. Appl. Phys. 66(3), Aug. 1, 1989, American Institute of Physics, pp. 1444-1453.
Scott, et al., Ferroelectric Memories, Science Magazine, Dec. 15, 1989, vol. 246, No. 4936, pp. 1400-1405.
Benedetto, et al., Radiation Evaluation of Commercial Ferroelectric Nonvolatile Memories, IEEE Transactions on Nuclear Science, vol. 38, No. 6, Dec. 1991, pp. 1410-1414.
Coic, et al., A Study of Radiation Vulnerability of Ferroelectric Material and Devices, IEEE Transactions on Nuclear Science, vol. 41, No. 3, Jun. 1994, pp. 495-502.
Reinhardt Krause, Motoroloa Signs for Ferroelectric RAM Deal, Electronic News, Jun. 6, 1994.
Advantages of the FM24C16 Serial 16kb FRAM Memory, Ramtron International Corporation, Jan. 1999.
Derbenwick, et al., Ferroelectric Memory: On the Brink of Breaking Through, Circuits and Devices Jan. 2001.
Scheick, et al., Radiation Response of Emerging FeRAM Technology, Nonvolatile Memory Workshop, Beacon eSpace at Jet Propulsion Laboratory, San Diego, CA, Nov. 7, 2001. http://hdl.handle.net12014/13434.
Hidemi Takasu, Ferroelectric memories and their Applications, Microelectronic Engineering 59 (2001) pp. 237-246, Kyoto, Japan.
Katz, Richard, Ramtron Serial FRAM Heavy Ion Test, BHL, Nov., 1998, Digital Engineering Institute.
Namkung, et al., Reliability and Endurance of FRAM: A Case Study, Non-Volatile Memory Technology Symposium 2002, Honolulu, HI, Nov. 4, 2002. http://hdl.handle.net12014110677.
Fujitsu Develops High Capacity, High Speed Chip with Embedded FRAM for RFID Tags, Tokyo, Feb. 27, 2003, Fujitsu Limited.
Kamp, et al., Adaptable Ferroelectric Memories for Space Applications, Celis Semiconductor Corporation, Colorado Springs, CO, 2004 IEEE, pp. 149-152. http://celis@celis-semi.com.
Chu, et al., The Endurance Performance of 0.5um FRAM Products. Ramtron International Corporation, May 2005. http://www.ramtron.com.
Fujitsu Introduces New, Light, Cost-Effective RFID Tages with 256 Bytes of FRAM for Product Tracking, Distribution Applications, Sunnyvale, CA Aug. 9, 2005, Fujitsu Microelectronics America, Inc.

Kamp, et al., High Density Radiation Hardened FeRAMSs on 130 nm CMOS/FRAM Process, Non-Volatile Memory Technology Symposium, 2005, Volume, Issue, Nov. 7-10, 2005.

Sun, et al., Data Retention Performance of 0.5 urn FRAM Products, Ramtron International Corporation, Apr. 2006. http://www.ramtron.com.

F-RAM Technology Brief, Ramtron International Corporation, Sep. 2007. http://www.ramtron.com.

Scheick, et al., Memories: Radiation Test Results, A Scientific Study of the Problems of Digital Engineering for Space Flight Systems, With a View to their Practical Solution, NASA Jet Propulsion Laboratory, Non-Volitile Memory Technology Symposium, Jan. 15, 2000.

Radiation Dose Monitors, Environmental Metrics, Inc. (Irwindale, CA), Missile Defense Agency, Technology Applications Program, 2008. http://www.mdatechnology.net/techprofile.aspx?id=347.

Derbenwick, et al., Advances in FeRAM Technology, Non-Volatile Memory Technology Symposium, Nov. 1-15, 2000, Arlington, VA.

* cited by examiner

TRACKING SYSTEM FOR GAMMA RADIATION STERILIZED BAGS AND DISPOSABLE ITEMS

CROSS-REFERENCE TO RELATED APPLICATIONS

The present application is a continuation-in-part of U.S. patent application Ser. No. 11/742,844, filed May 1, 2007, which is a continuation of U.S. patent application Ser. No. 11/082,086, filed Mar. 16, 2005, which claims the benefit of U.S. Patent Application Ser. No. 60/553,511, filed Mar. 16, 2004, and also claims the benefit of U.S. Provisional Application No. 60/921,924, filed Apr. 4, 2007 and claims the benefit of U.S. Provisional Application No. 60/862,654, filed Oct. 24, 2006, all of which are incorporated herein by reference as if fully set forth.

BACKGROUND

The present invention relates to a tracking system for ionizing radiation sterilized bags, filters, valves, tubing, medical devices and other disposables or non-disposables utilized in various fields, such as chemical, pharmaceutical, biological or other controlled manufacturing processes and/or storage, as well as for packaging and shipping of comestible products.

Many manufacturing and storage processes in the chemical, medical, pharmaceutical and biological fields utilize batch processes with various disposables or single use items for holding and transferring product in various stages, and include, for example, polymeric pouches or bags, tubing, valves, etc. Biobags or biotech drug processing bags, disposable bags or single use systems are generally made of polymeric sheet material which is manufactured into large or small bags that hold batches of pharmaceuticals or other materials during and/or after the manufacturing process. These bags and disposables must generally be sterilized, for example using ionizing radiation such as gamma radiation prior to use. Such bags are often used to make, store and/or distribute a single batch of drugs, and/or to store a batch of drugs or other material until it is ready to be dispensed into vials or bottles for distribution or further storage, or may be dispensed directly into further manufacturing and processing equipment. For example, such bags can be placed into and act as a liner for a stainless steel vat in a bio reactor. Generally, it is necessary not only to be able to track the information regarding the bag or disposable up until the time that it is discarded, but also its contents and the various steps or processes that have been carried out.

In the medical field, disposables are also used that are gamma radiation sterilized by the manufacturer, prior to being sent to a doctor or hospital for use in patient care. This can be done for individual items or in lots. These medical disposables are also tracked to ensure safety. Further, additional medical items, such as implants, also require gamma radiation sterilization and similar tracking requirements.

In the field of comestible products, including fruits and vegetables that are harvested, it would be desirable in many instances to track not only products, but whether or not the packaging with or without the products therein have been sterilized.

Systems are known for permanently associating and identifying indicia with such bags or disposables, such as bar codes. This is typically done in order to provide positive identification of the bag and/or disposable, or the associated product. Such indicia may be visually readable by a user or machine-readable, such as a bar code. This type of identification has been done in accordance with specific industry requirements, where it is often required to specifically identify the product and/or steps being tracked. However, such bar code systems do not allow any additional data to become associated and or carried with the item. Additionally, many users still use manual tracking of certificates of compliance, certifications of analysis, certifications of ionizing radiation exposure, dosimetry records as well as various other data that may become associated with a bag or disposable item and/or its contents during further manufacturing and/or processing RF ID tags are known to allow information to be written to a specific tag associated with an item. Generally, the heart of an RF ID system is an information-carrying tag which functions in response to a coded RF signal received from a mobile reader or base station. The tag reflects the incident RF carrier back to the RF ID tag reader or base station and the information transferred as the reflected signal is modulated by the tag according to its programmed information protocol. RF ID tags may be active, in which a power source is provided, or passive, in which the energy for the reflected signal is derived from the RF signal from the base station or RF ID tag reader used to interrogate the tag. The RF ID tags can be programmed or encoded with specific information, such as an individual identification numbers for a product, such as serial numbers, and/or additional product information, depending upon the complexity of the RF ID tag. Read/write RF ID tags are also known which can be used to receive and store additional or updated data.

While RF ID tags have been known and have been adapted to various uses, such as inventory control and theft protection of items, they have been unsuitable for such bio bag or disposable items that require gamma radiated for sterilization due to the negative effect on the RF ID tag and the loss of associated data stored therein.

Accordingly, it would be desirable to provide a better system to track predetermined events with respect to items, such as those noted above, that are sterilized by ionizing radiation. It would also be desirable to be able to use the identification to obtain data, specifications and certifications as required from a manufacturer. It would also be desirable to provide an easier and more efficient system for tracking such items for various reasons, such as inventory control, active or useful life, shelf life of contents, etc.

SUMMARY

Briefly stated, the present invention provides a tracking system for ionizing radiation irradiated items, such as bio bags, filters, medical devices or other disposable or non-disposable items, as well as products located therein. The system includes a memory storage component that is not affected by ionizing radiation or encapsulated in an ionizing radiation resistant holder that is attached to the bio bag or other item, or to a container or containers holding a batch or lot of items. The bio bag or item is then irradiated with the ionizing radiation, which is preferably gamma radiation for sterilization, but can be other types of radiation, such as alpha or beta radiation. A unique identification, sterilization certification and/or other data can be written to the memory storage component by the supplier/manufacturer. A memory reader is provided which is usable by a user to obtain the identification from the memory storage component on the ionizing irradiated item, preferably during or after the ionizing irradiated item is placed into use at the user facility. The memory reader includes a user input for at least one trackable event, which can be, for example, an installation date, product identification, batch identification, certifications or other data. The memory reader preferably has the ability to "write" data to the memory storage component regarding the at least one trackable event or a series of trackable events, so that the data is specifically associated with the irradiated item for later reading, verification or data recovery. The memory reader is also preferably at least one of connectable to a PC for local data gathering and analysis, or to an internet or compatible for uploading the identification and any user input to an internet accessible device which, for example, can also be a PC.

At least one of a local and an internet accessible database is provided, having specific irradiated item related information, including at least one of a manufacturing date, a batch number, a lot number, material specifications, material lot number, certifications for sterility, certificates of compliance, size specifications, functional specifications, description, customer data and customer application associated with the identification. The database provides access for a user to obtain this information based on the identification from the memory component and receives and stores data related to the at least one trackable event, preferably by uploading the data from the memory reader. In a preferred application, the memory component is a RF ID tag that is not affected by gamma radiation that is used in connection with gamma radiation sterilized items, and the memory reader/writer is an RF ID reader/writer that is capable of reading RF ID tags and writing data to RF ID tags.

In another aspect, the invention provides a method of tracking ionizing radiation irradiated items using a tracking system. The method includes: affixing a memory component that is not affected by ionizing radiation that is encoded with an identification and other data related to the item onto the item to be irradiated; providing information relating to the irradiated item to a data base correlated to the identification; a user reading the memory storage component with a memory reader; the user inputting at least one trackable event regarding the irradiated item into the memory reader; the memory reader writing the information back on the memory storage; and uploading data from the memory reader to a PC or an internet accessible device or connecting the memory reader to an internet; accessing a data base; retrieving data relating to the irradiated item from the data base using the identification; and uploading data on the at least one trackable event to the data base to build the data base.

In another aspect, the invention provides a tracking system for dose mapping of lots of items to be irradiated, such as bags, containers, filters, medical devices or other disposable or non-disposable items to be ionizing radiation sterilized, as well as products located therein, including means for recording the level of radiation. The system includes a tracking tag assembly having a memory storage component, that is either not affected by ionizing radiation or encapsulated in a radiation resistant holder, and a dosimeter is incorporated with the memory storage component. The memory storage component-dosimeter assembly is positioned between boxes or cartons or attached to boxes at certain locations in a lot of boxes or cartons holding the items to be irradiated. The lot of items is then irradiated with ionizing radiation, such as gamma radiation. The level of radiation received at the various locations is then read from the dosimeter and written to the associated memory storage component so that the radiation level for the lot can be mapped to confirm or validate the level of radiation received at all locations. Preferably, a memory reader-writer is provided, which is usable by a user to input trackable data read from the dosimeter to its associated memory storage component so that the information can be kept and stored or later downloaded into a database for further tracking or data access The memory reader is also preferably at least one of connectable to a PC for local data gathering and analysis, or to an internet or compatible for uploading the identification and any user input to an internet accessible device which, for example, can also be a PC.

The memory storage component-dosimeter assembly is preferably made using an RF ID tag and a dosimeter, and is attached to selected items per lot to allow dose mapping for a group or lot of items, or to a lot container for a group of items, for example boxes containing a number of specific items such as a box of disposable syringes, or selected ones of such item containers to again allow dose mapping of gamma radiation used for sterilization.

The invention also provides a combined gamma radiation resistant RF ID tag-dosimeter assembly that allows a user to quickly and easily affix the assembly to an item or container of items to be sterilized and tracked.

BRIEF DESCRIPTION OF THE DRAWINGS

The foregoing Summary and the following detailed description will be better understood when read in conjunction with the following drawings, which illustrate preferred embodiments of the invention. In the drawings.

DETAILED DESCRIPTION OF THE PREFERRED EMBODIMENT(S)

Certain terminology is used in the following description for convenience only and is not limiting. The words "right," "left," "lower" and "upper" designate directions in the drawings to which reference is made. The words "inwardly" and "outwardly" refer to directions toward and away from, respectively, the tracking system, RF ID tags and/or items shown and designated parts thereof. Reference to a list of items recited as "at least one of A, B or C" (where A, B and C represent the items being listed) means any single one of the items A, B or C, or combinations thereof. The terminology includes the words above specifically mentioned, derivatives thereof and words of similar import.

Figure 1:
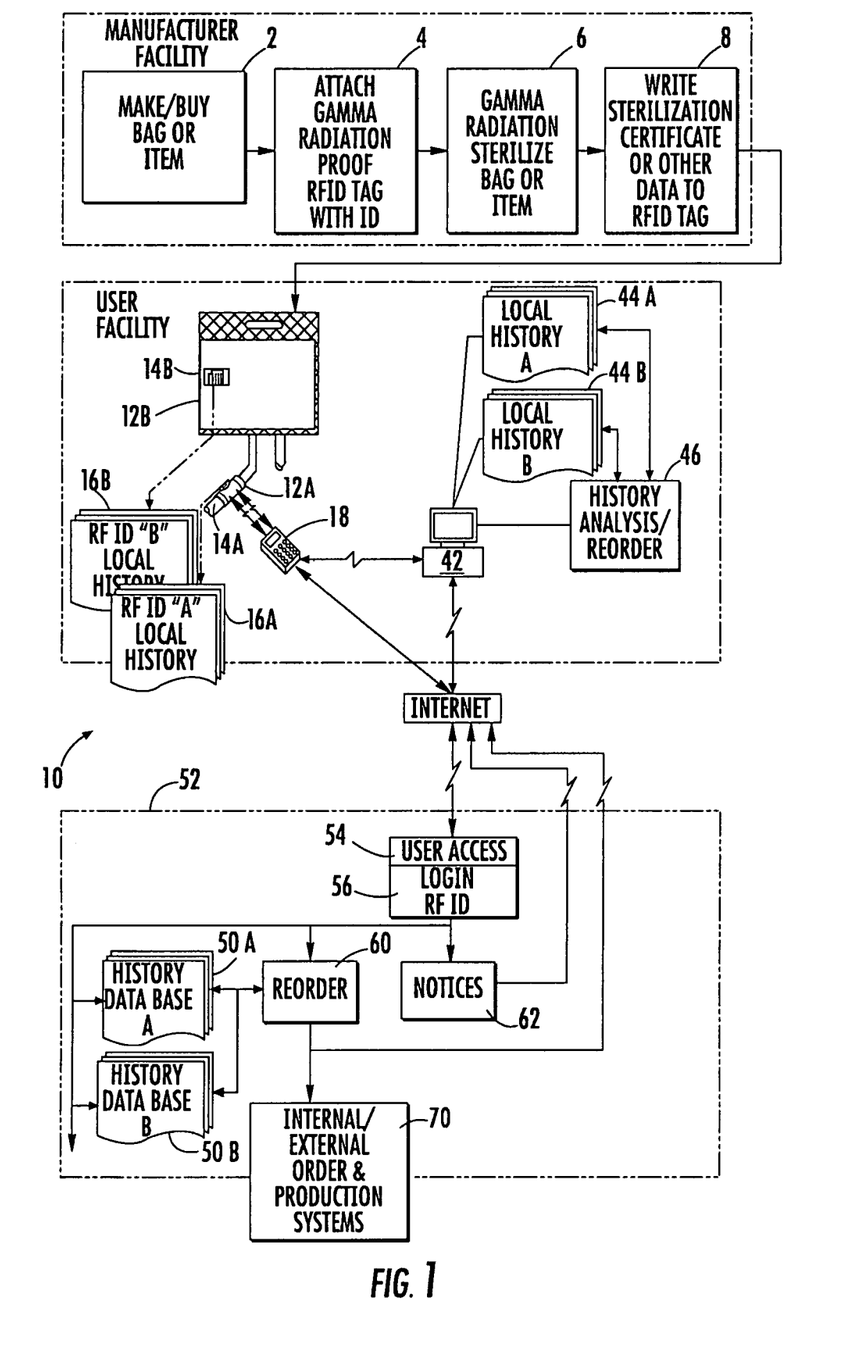
FIG. 1 is a schematic view showing the gamma radiation sterilized item tracking system in accordance with the present invention.

Referring now to FIG. 1, a tracking system 10 for ionizing radiation irradiated items in accordance with the present invention is shown. The tracking system 10 is used in conjunction with items 12A, 12B with attached memory storage components that are not adversely affected by ionizing radiation, preferably in the form of RF ID tags 14A, 14B (also generally referred to as RF ID tag 14) which are able to be gamma radiation sterilized without adverse effect on the memory. The RF ID tags 14A, 14B are of the type generally known in the art and may be an active or are preferably passive RF ID tag that is either gamma radiation resistant or is encapsulated in a gamma radiation resistant enclosure, as explained in further detail below. In one preferred embodiment the RF ID tags are manufactured with FRAM (Ferroelectric Random Access Memory) based memory, such as that available from Fujitsu, which has been discovered to be usable in the production of RF ID tags that are resistant to degradation and data loss when exposed to gamma radiation.

The items to be irradiated with ionizing radiation are either made or purchased by a manufacturer at a manufacturing/processing facility, as indicated at 2. Those skilled in the art will recognize that the manufacturing facility referenced is intended to refer to one or more facilities where manufacturing, processing, ionizing radiation sterilization or other steps take place. The memory storage component, preferably in the form of the gamma radiation proof RF ID tag 14 is then attached, as indicated at 4, and explained in detail below. The RF ID tags 14 are preferably encoded with a unique identifier. The item with the attached memory storage component is then irradiated. In the preferred embodiment, the item with the ionizing radiation resistant RF ID tag is gamma radiation sterilized, as indicated at 6. Sterilization certifications and/or other data relating to the item and/or its application can also be written to the memory component, as indicated at 8. The item 12A, 12B is then shipped from the Manufacturer/processing facility to a User Facility, pre-sterilized and ready for use in various applications, processes or manufacturing. The invention can also be used to track a lot or plurality of items in a single container by affixing the RF ID tag 14 to the container.

As shown in FIG. 1, the RF ID tags 14A, 14B are encoded with at least a unique identification or serial number, which is preferably assigned by the manufacturer, but could be set by a user of the tracking system 10 in order to allow each item 12A, 12B for which tracking is desired to be tracked individually.

While FIG. 1 only illustrates two such items in the form of a filter 12A and a bag 12B being tracked, those skilled in the art will understand from the present disclosure that the tracking system 10 can be used to track any number of items, such as liners for vessels, bags, filters, medical devices, and other disposables and non-disposables or items that are ionizing radiation irradiated, and in the preferred embodiment, gamma radiation sterilized, such as disposable bio processing bags that are critical in various pharmaceutical, biological and/or chemical processing applications. Tracking can relate to the item 12A, 12B itself, the contents or materials placed therein or passed therethrough, shelf life or any other requirements or certifications that may require tracking either for compliance with specific purity and/or processing requirements mandated by specific industry standards bodies or the FDA, allowing full life cycle tracking of all steps for the disposable item 12A, 12B or its contents. Tracking this data for specific items or groups of items is also desirable for many end users who do not have any means to track and capture data so that a replacement analysis or history can be established based on various tracked events, such as the batch processed and specific data related thereto.

Preferably, the memory storage component, in the form of the RF ID tag 14 is also protected by an external pouch, mold strap or laminations as shown in FIGS. 2-3 or FIGS. 5-8, as discussed in detail below, in order to prevent damage in use.

The RF ID tag 14 is attached to the item(s) 12A, 12B or other article to be tracked during manufacture (for example, 12C-12F discussed below), but may be attached after the item(s) 12A, 12B are at a user's facility, depending upon a particular user's tracking requirements. However, this would not allow certification information on the gamma sterilization to be directly associated with the tagged item. The attachment methods can be varied, but a permanent or semi-permanent attachment is preferred so that the RF ID tag 14 cannot be inadvertently removed or tampered with.

Figure 2:
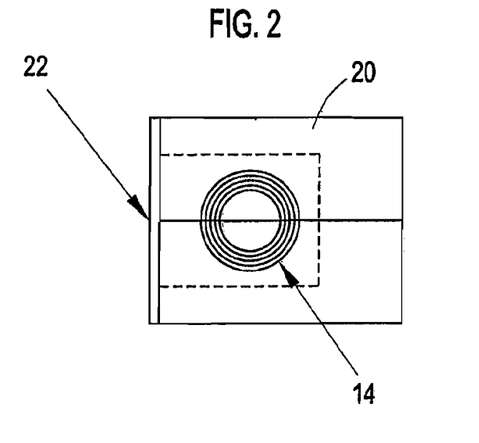
FIG. 2 is a side view of a preferred embodiment of a polymeric pouch or molded strap enclosure for an RF ID tag in accordance with the present invention.
Figure 3:
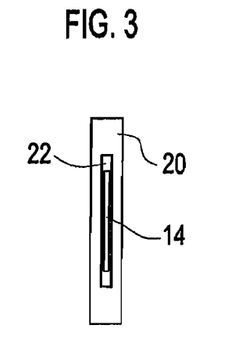
FIG. 3 is a side view of the pouch of FIG. 2.
Figure 4:
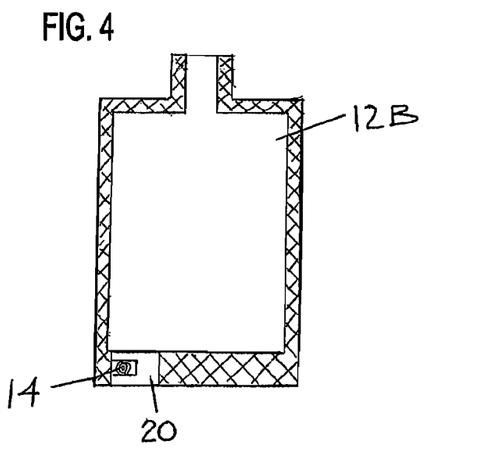
FIG. 4 is an elevational view of the silicone or polymeric pouch enclosed RF ID tag of FIG. 2 shown in the installed position on an item to be gamma radiation sterilized.

In one preferred application for the tracking system 10, the RF ID tag 14 is sealed in a molded pouch 20 using an end seal 22, as shown in FIGS. 2 and 3. The pouch 20 is then attached to the item, such as a bio bag 12B, as shown in FIG. 4 by a suitable adhesive, which can be silicone based, heat sealing, or other means. The pouch 20 could also be formed by heat sealing two layers of material together, and can then be attached by heat sealing it into or on a seam area of the bag 12B, as shown in FIG. 4. The pouch 20 can be formed of clear silicone or other clear polymeric material, and other visually readable indicia can also be provided with the RF ID tag 14 in the pouch. This pouch 20 can be installed on the bag 12B at the manufacturer's facility. While a silicone pouch 20 is preferred, other types of sealable housings can be utilized depending on the environment, as well as any other pertinent considerations. Additionally, to the extent that an RF ID tag 14 that is not made of an ionizing radiation resistant material is used, the pouch 20 can be made of an ionizing radiation resistant or protective material. For example, a silicone or other binding material matrix infused with powdered Lead could be effective.

Figure 5:
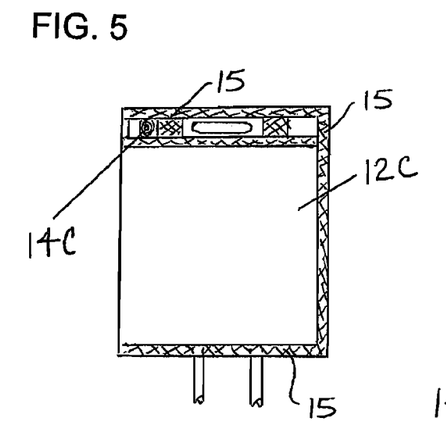
FIG. 5 is an elevational view of an RF ID tag held in a pocket formed into the edge of a bag during or after manufacture using heat seals.

Referring now to FIG. 5, the RF ID tag 14 can be connected to a bag 12C by forming a pocket directly in the bag material, for example at the top edge, using heat seals 15 during formation of the bag 12C. The pocket could also be formed at the bottom edge or any other suitable location.

Figure 6:
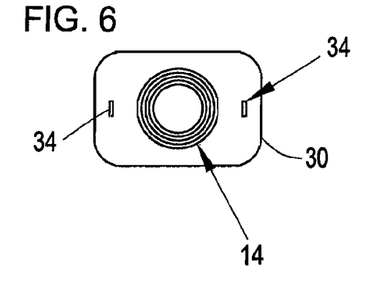
FIG. 6 is a plan view of a plastic laminate enclosed RF ID tag in accordance with a first alternative preferred embodiment of the invention.
Figure 7:
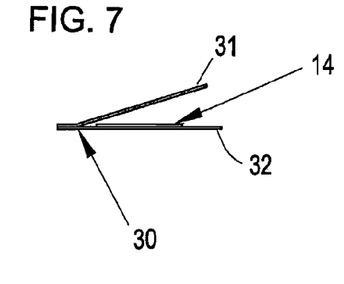
FIG. 7 is a side view showing the RF ID tag being installed in the plastic laminate tag of FIG. 6.
Figure 8:
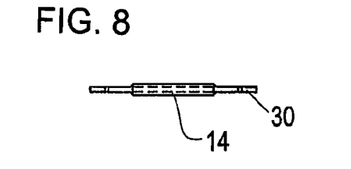
FIG. 8 is a side view of the plastic laminate enclosed RF ID tag of FIG. 6.
Figure 11:
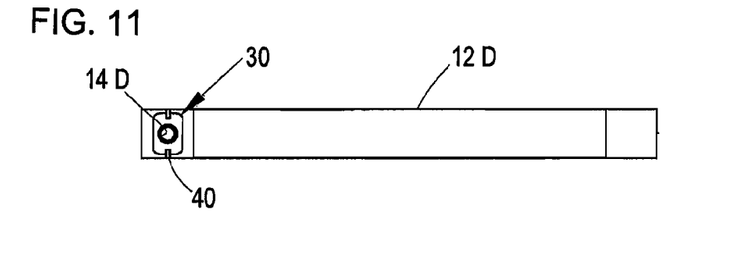
FIG. 11 is an elevational view of the plastic laminate enclosed RF ID tag of FIG. 6 attached to a filter or tubing using a cable tie.

Referring now to FIGS. 6-8, another holder 30 for the RF ID tag 14 according to a first alternative preferred embodiment of the present invention is shown. The holder 30 comprises two pieces of laminate 31, 32, preferably made of a suitable clear polymeric material, which can be for example EVA, PE, PP or other thermoplastic elastomers, that are connected together with a suitable adhesive with the RF ID tag 14 sandwiched between the laminates 31, 32. Slots 34 are provided in the holder 30 so that it can be attached to a desired item using a cable tie or safety wire 40. FIG. 11 shows the holder 30 with an RF ID tag 14D attached to a hose 12D used for materials being processed, which could be made from, for example, a silicone, thermoplastic, C FLEX or other type of tubing.

Figure 9:
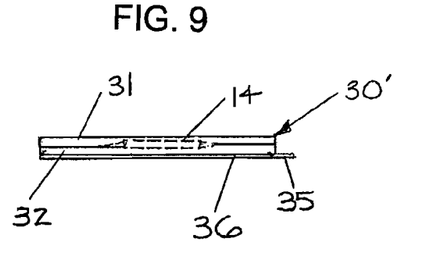
FIG. 9 is a side view of an alternate embodiment of a laminate enclosed RF ID tag having an adhesive layer and a release sheet which can be removed prior to attachment of the RF ID tag to an item to be ionizing radiation sterilized.
Figure 10:
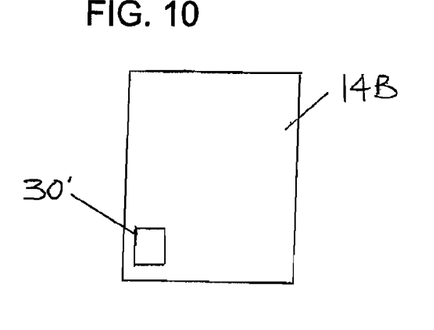
FIG. 10 is an elevational view of the plastic laminate enclosed RF ID tag of FIG. 9 attached to an item to be ionizing radiation sterilized, and in particular a bag.

Referring to FIGS. 9 and 10, an alternate embodiment of the holder 30' is provided in which the RF ID tag is laminated between the two pieces of laminate 31, 32. The bottom of the second laminate 32 is coated with an adhesive 36, and a release sheet 35 covers the adhesive 36. The release sheet 35 scan be easily removed, that the enclosure with the RF ID tag 14 can be attached to an item, such as the bag 14B shown in FIG. 9.

Figure 12:
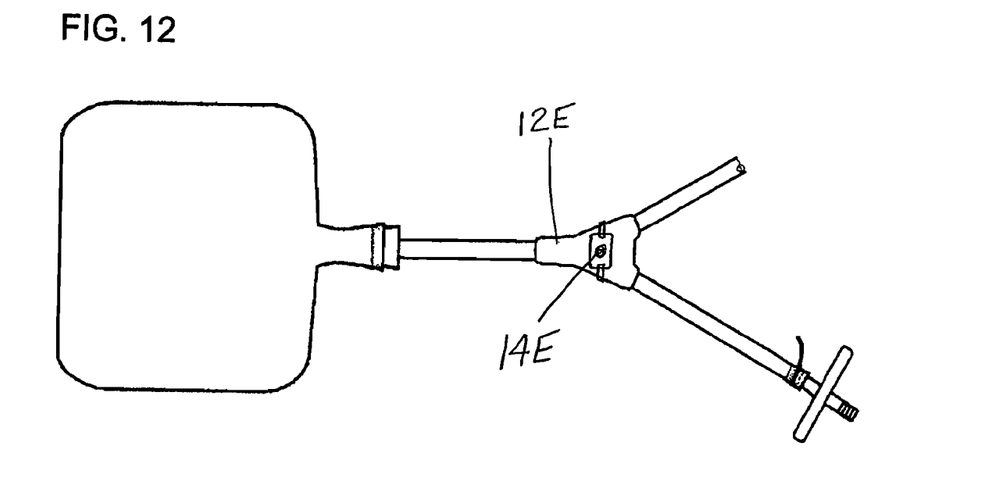
FIG. 12 is an elevational view of a manifold having the plastic laminate enclosed RF ID tag of FIG. 6 attached using a cable tie.

Referring to FIG. 12, a manifold assembly 12E is shown with the RF ID tag 14E shown being attached to the manifold using the holder 30 and a cable tie 40. The manifold assembly can include the manifold, tubes and a vessel or bag connected thereto. Those skilled in the art will recognize that while one configuration of a manifold assembly 12E is shown with various attachments, the invention is not limited to any particular configuration or arrangement of the manifold assembly.

Figure 13:
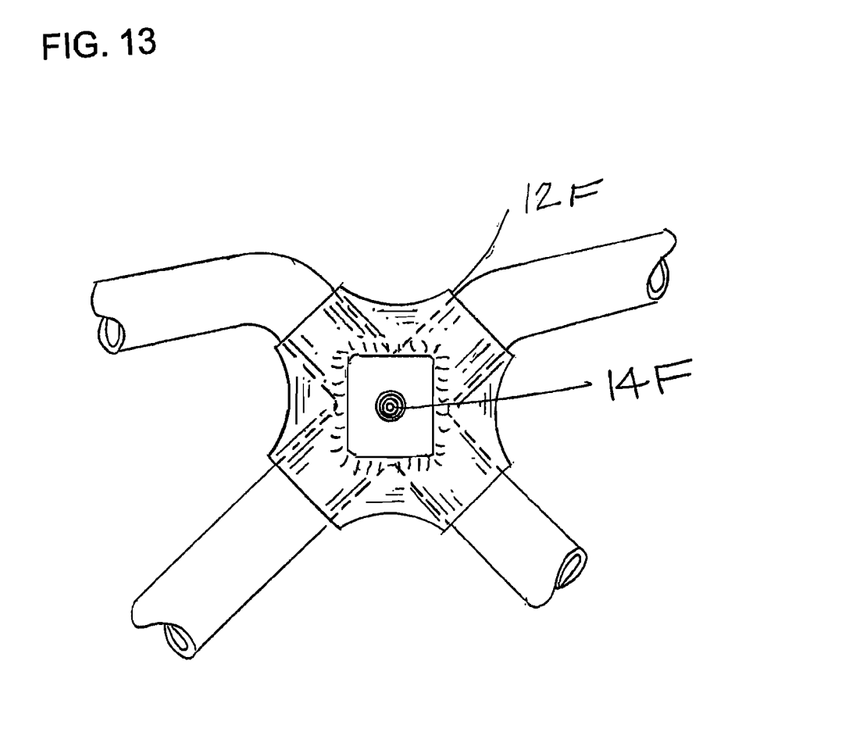
FIG. 13 is an elevational view of a manifold having an RF ID tag in accordance with the invention molded into the manifold surface during manufacture.

Alternatively, as shown in FIG. 13, an enlarged view of a manifold assembly 12F is shown that includes the RF ID tag 14F that is integrally connected to the manifold during manufacture, for example by placing the RF ID tag 14F in a cavity in the mold used to form the manifold 14F prior to filling the mold with a polymeric material during a molding process. Alternatively, the RF ID tag 14F could be molded on in a secondary molding process in which the completed manifold 12F is placed in a mold and additional polymeric material is injected to encapsulate the RF ID tag 14 and connect it to the manifold 12F. Those skilled in the art will recognize that this type of molded on connection of the RF ID tag can be utilized with other items, for example, tubing made of silicone, thermoplastic, C FLEX or other materials, or other types of items.

Those skilled in the art will recognize that various other types of enclosures, tapes and/or adhesive attachment systems can be utilized to attach an RF ID tag to an item 12A-12F that is to be tracked by the system 10 according to the invention, or that the RF ID tag 14 can be incorporated into the item during manufacture.

Referring again to FIG. 1, the ionizing radiation irradiated item to be tracked 12A, 12B, etc., is preferably placed into use at a user facility. This can be used for pharmaceutical and/or biochemical processing of drugs and/or other high purity requiring compounds and/or chemical processing facilities.

An memory reader, preferably in the form of an RF ID tag reader 18 is provided, which is adapted to be used by a user to obtain the identification from the memory storage component which is the RF ID tag 14 in the preferred embodiment. Preferably, the RF ID tag reader 18 also includes a user input, preferably in the form of a keyboard, for tracking at least one trackable event. The trackable event can be related to a use date of the item 12A, 12B, or it could also include a series of trackable events, such as how many steps in a process the item and/or its contents have been subjected to. These trackable events in the context of the tracking system 10 preferably relate to certification requirements, product life, or other trackable requirements for validation and/or verification of product. Through the tracking of these events, it is possible to provide a more accurate validation/certification database for various chemical, biological, pharmaceutical or medical products made using or contained within the item(s) 12A, 12B.

The memory reader 18 preferably also has a "write" capability and the memory storage components preferably in the form of the RF ID tags 14A, 14B can be programmed with data on the at least one trackable event. In a preferred embodiment, the trackable event data is stored in an RF ID tag 14A, 14B data file 16A, 16B, so that the history of the trackable event or trackable events, such as batch or ingredient information is actually stored in the RF ID tag data file 16A, 16B. This allows auditing of the history of trackable events for the specific items 12A, 12B or their contents, if required, for example by the FDA or some other agency requirement. Additionally, it prevents the loss of data from another piece of equipment, such as a PC, through hardware or software failure. In the preferred embodiment, the RF ID tag data file 16A, 16B can receive and store entries for a number of trackable events or data items. The type and amount of data stored can be varied, as desired, based on a particular application.

The memory reader 18 is also at least one of connectable to a PC 42 or an internet, for example, through a wireless connection as in PDAs or other wireless internet access devices (shown as a dashed line in FIG. 1), or is compatible for uploading the identification from memory storage component or the RF ID tag 14 and the user input to an internet accessible device, for example, a PC 40 as shown in FIG. 1. Such connections to the internet, either through a wireless connection and/or via a modem, DSL or T1 cable are generally known and accordingly, a further description is not necessary for those of ordinary skill in this field.

The memory reader 18 can be a portable, hand-held device, as shown, or can be part of a fixed scanning and/or conveying system.

Preferably, a local tracking history database 44A, 44B is provided on the PC 42 in which data from the memory reader 18 can be stored and tracked for each item 12A, 12B being tracked. The PC 42 preferably also includes a history analysis and reorder system that is programmed using software to allow analysis of the local history databases 44A, 44B so that a user can determine a shelf life of the item, such as a bio bag 12B and/or its contents, and can also be used to track usage so that re-orders for the items can be placed.

Preferably, the tracking system 10 also provides user access to a manufacturer or vendor of the tracking system 10 for additional data and tracking ability based on the identification stored on the memory storage component of the items 12A, 12B. The user makes an internet connection to an internet accessible database 50A, 50B, preferably located in a website 52 operated by the process equipment manufacturer or other tracking organization. The internet accessible database 50 includes information related to the items 12A, 12B and/or the contents thereof, including but not limited to at least one of a manufacturing date, batch number, lot number, material specifications, material lot number, certificates of compliance, size specifications, or any customer-related data with respect to the intended use or application. This information can all be provided in the database 50A, 50B, etc. by the user, or can be loaded by the manufacturer, and is associated or correlated with the memory storage component preferably in the form of the RF ID tag 14A, 14B, etc. for the items 12A, 12B, etc.

The internet accessible database 50 provides access to a user, preferably through a user access system 54, wherein a user logs in using a specific user ID at a log in screen 56. During the log in process, or thereafter, data on the at least one trackable event can be uploaded from the memory reader 18 or the internet access device 42 and can then optionally be stored in the website 52. This is preferably done based on the RF ID for the particular item 12A, 12B, etc., in question, based on the data which has been collected by the user at the user facility. In one embodiment, the data related to the at least one trackable event is stored in a history database 50A, 50B, etc., which is used to store data on one or more trackable events, which in the preferred embodiment are related to material contents, shelf life, sterilization certification or various other certifications.

Additionally, a reorder system 60 can be provided, which allows the user to reorder new items based on the memory storage component or RF ID tag 14A, 14B, etc., identification. This is preferably used in connection with the RF ID and the respective database 50A, 50B, etc., so that all of the specifications for particular items 12A, 12B, etc., can be obtained from the database 50 to streamline the reorder process. The local history database 44A, 44B and/or the history database 50A, 50B allow order patterns in comparison to the series of trackable events stored in the database to be compared and/or the trackable events can be used in connection with generating orders based on an expected shelf life of the items 12A, 12B and/or their contents. Notices can preferably be generated and sent via e-mail or may be generated internally to send a reminder by mail or via other means.

Additionally, a reorder system 60 can be provided which communicates, preferably electronically, directly with the manufacturer's order and productions systems 70, which can be internal or external, so that manufacture of the new process equipment 12A, 12B is completed and the new process equipment shipped prior to expiration of the expected life of installed process equipment 12A, 12B. The local history database 44A, 44B and/or the website database 50A, 50B can then be updated, either directly or through an internet connection with the data for the new process equipment.

In addition to reorders, notices can be sent to a user regarding at least one of maintenance information and/or recall information for the item 12, which is accessible based on the memory storage component or RF ID tag identification when a user logs in using the user access connection, or which can be automatically generated and e-mailed to a user, as indicated at 62.

The system 10 preferably provides 24-hour access to a user of all information regarding any specific ionizing radiation sterilized item 12 via the internet and the unique identification provided by the memory storage component or RF ID tag 14. The system 10 also provides an easy and convenient way for a user to reorder existing items, based on an existing specification in the database 50 for the particular user application.

Additionally, for items used to produce FDA-approved or tested products, the system provides a means for tracking items which can degrade over time or contamination due to degradation.

By optionally providing automatic contact to the customer that the item 12 needs replacement and/or by providing an option for a customer to have automatic reordering carried out based upon the database 50A, 50B, the present invention can streamline the ordering and replacement process and also avoids downtime associated with failures which could have been easily predicted.

In a method according to the invention, the process equipment tracking system 10 is used to track process equipment 12A, 12B, etc. and for obtaining data related to, for example, the manufacturing date, batch number, lot number, material specifications, material lot number, certificates of compliance, size specifications, description, customer data and/or customer application associated with a particular unique identification for the items 12A, 12B. The memory storage component or RF ID tag 14A, 14B encoded with the particular identification for an item, is affixed preferably through a reliable, and preferably semi-permanent or permanent connection. The information related to the item 12A, 12B is loaded into the database 50 and correlated to the identification provided by the RF ID tag 14A, 14B. This can be done by a manufacturer or another service. In order to utilize this system, a user reads the memory storage component or RF ID tag 14A, 14B utilizing an memory reader 18. The user also inputs at least one trackable event regarding the item 12A, 12B or its contents into the memory reader 18. The data from the memory reader 18, specifically data on the at least one trackable event, is written back to the memory storage component or RF ID tag 14A, 14B, so that there is a record of the trackable event associated directly with the item 12A, 12B. The data along with the RF ID tag identification can also be uploaded from the memory reader 18 to PC 42 and stored in a local history database 44A, 44B based on the item ID. The memory reader 18 itself may also be connected to the internet, for example, through a wireless or plug connection or the internet can be accessed from the PC 42. The user can then access the database 50 and retrieve data relating to item(s) 12A, 12B using the specific identification provided by the memory storage component or RF ID tag 14A, 14B. Additionally, data on the at least one trackable event is preferably uploaded to a database 50A, 50B in order to build the database. Preferably, a user can use the local history database 44A, 44B and/or log in to the tracking system 10 on a periodic basis and analyze data regarding a series of trackable events, for example, the number of ingredients added into a bag 12B, the number of batches of material that were processed and/or any other periodic trackable events on process equipment life. The website databases 50A, 50B can be used in conjunction with the reordering system 60. A user can determine a shelf life expectancy or ingredients based on the history database 44A, 44B or 50A, 50B.

In a preferred embodiment, the reorder system 60 interfaces with the database 50A, 50B and electronically notifies the user to reorder particular items 12A, 12B for a specific application based upon an expiration of a shelf life expectancy.

Figure 14:
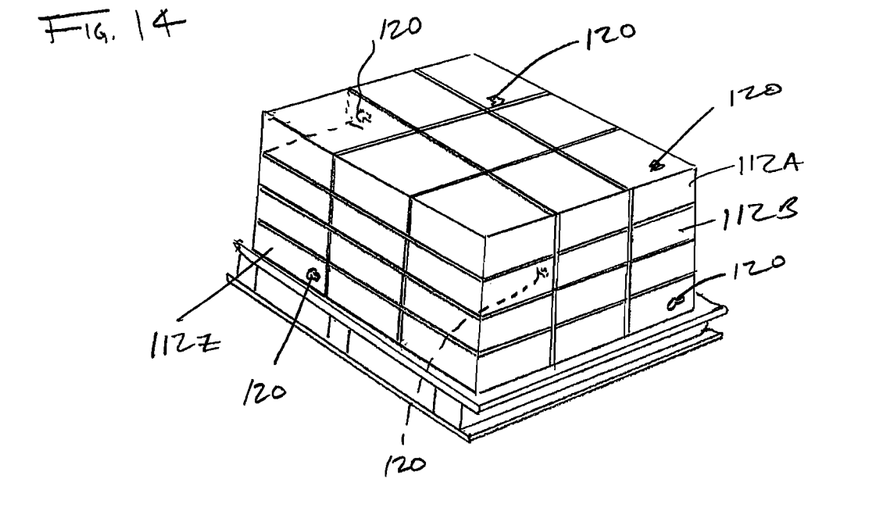
FIG. 14 is a perspective view showing a pallet of containers with tracking tag assemblies for ionizing radiation tracking and dose mapping in accordance with the present invention.
Figure 15:
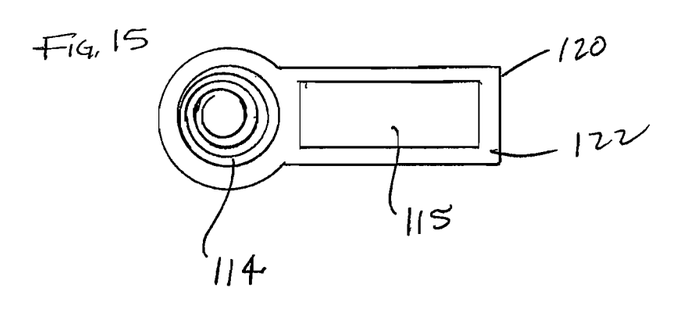
FIG. 15 is a view of a combined ionizing radiation resistant RF ID tag-dosimeter assembly in accordance with the present invention.
Figure 16:
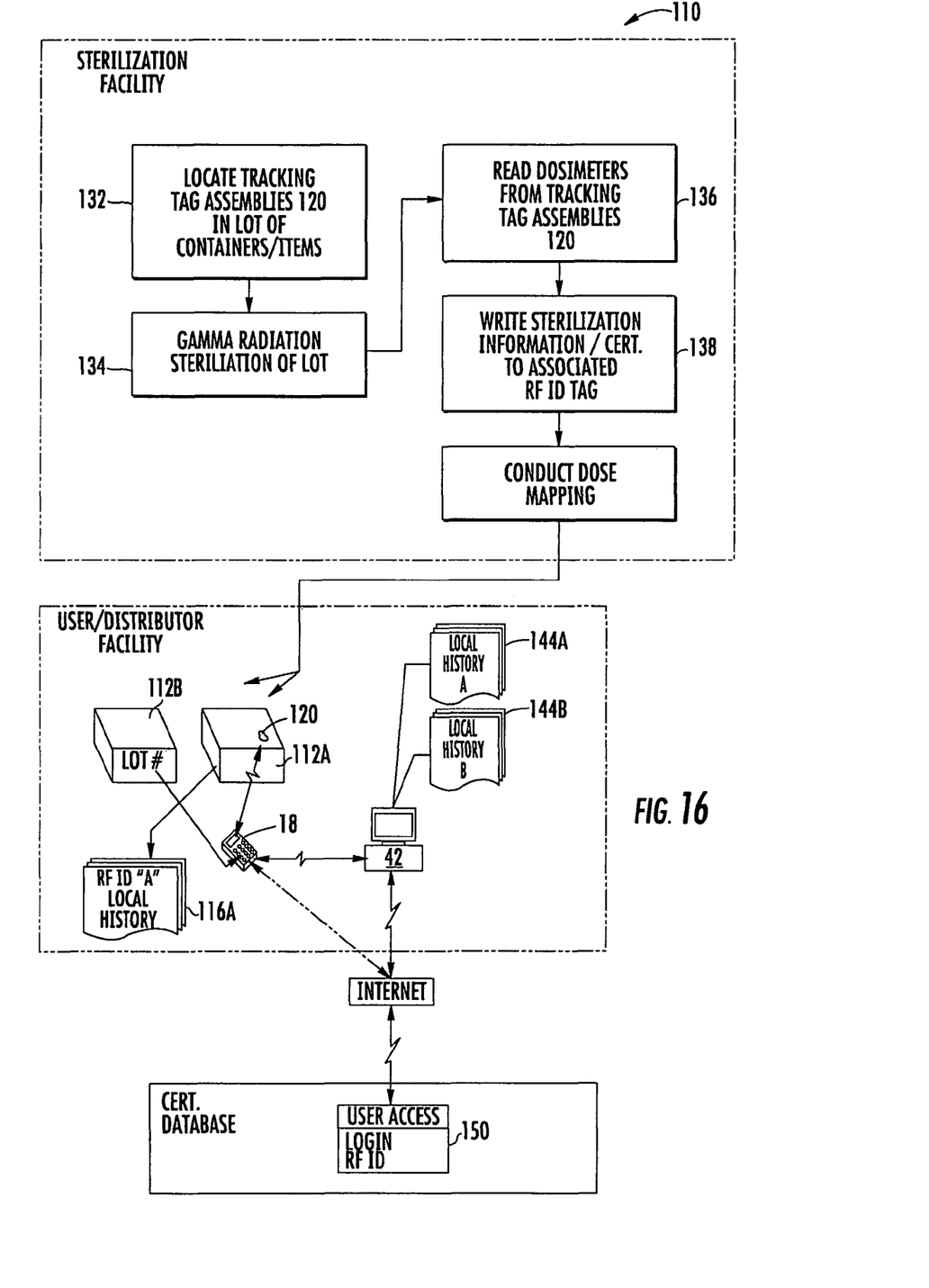
FIG. 16 is a schematic view showing the ionizing radiation sterilized item tracking system with radiation level tracking/validation in accordance with the present invention.

Referring now to FIGS. 14-16, a second embodiment of the tracking system 110 for dose mapping of gamma radiation sterilized items in accordance with the present invention is shown. The tracking system 110 is used in conjunction with a lot of containers or boxes 112A, 112B, . . . 112Z which contain items to be gamma radiation sterilized. Tracking tag assemblies 120 are attached to selected ones of the cartons 112A, 112B, . . . 112Z or are located between cartons at certain locations, as shown in FIG. 14.

As shown in FIG. 15, the tracking tag assembly 120 preferably includes an ionizing radiation proof memory storage component, which is preferably a gamma radiation resistant RF ID tag 114 and a dosimeter 115 attached to or connected to a single substrate 122, such as an adhesive backed polymeric material, or the memory storage component or ionizing radiation proof RF ID tag 114 and the dosimeter 115 located in or affixed to a common housing, such as by molding them into or onto a polymeric material base or by being mechanically retained or affixed in a common housing. The preferred RF ID tags 114 are of the type generally known in the art and may be an active or are preferably passive RF ID tag that is either ionizing radiation resistant, for example through the use of FRAM based memory which is not effected by gamma radiation, or is encapsulated in an ionizing radiation resistant enclosure, as noted above. The dosimeters 115 are also of the type known in the art. The RF ID tags 114 are preferably encoded with a unique identifier, Referring to FIG. 16, according to the invention, the tracking tag assemblies 120 are properly located, as indicated at 132. This can be in a set pattern or based on a prior "map." The locations can be written to the respective memory storage components or RF ID tag 114 of the tracking tag assemblies 120. The radiation of the lot of items takes place, as indicated at 134. This can be done for containers of items, such as medical instruments that are to be pre-sterilized, using ionizing radiation, such as gamma radiation, or can be for products packaged in bags or other containers, where not only the bag, but its contents are ionizing radiation irradiated with such as for gamma radiation sterilization. The dosimeter 115 for each of the tracking tag assemblies 120 is taken from its place and then read, preferably using a Photospectrometer, as indicated at 136. Sterilization levels, certifications, dosimetry records and/or other data relating to the sterilization of the lot of items can be written to the respective memory storage components or RF ID tags, as indicated at 138. Dose mapping can then be carried out in an automated manner by reading the data from the memory storage components or RF ID tags 114 that have associated location and radiation dosage data saved thereon.

The containers 112A, 112B, . . . 112Z are then shipped from the Manufacturer/processing facility to a User or Distributor Facility, sterilized and ready for use or further processing and tracking, similar to the system 10 above. The customer's information about the lot can also be written to the memory storage component or RF ID tag 114 along with time, date, personnel at the gamma radiation facility who processed the lot. Data on the specific lot, sterilization certification, or dose mapping, etc. can then be accessed by the User or Distributor based on the memory storage component or RF ID tag 114 using the reader-writer 18, as indicated at 112A, and/or based on a lot number being keyed in, as indicated at 112B. If present, the local memory storage component or RF ID tag 114 database 116A in the tracking tag assembly 120 can be accessed. Alternatively, the reader-writer 18 can be connected to a PC 42, either directly or wirelessly to access local history databases indicated at 144A, 144b, and/or the reader-writer 18 or the PC 42, can provide access to a remote database, that may be at the manufacturer or sterilization facility, that can be logged into, as indicated at 150, using an internet connection in order to retrieve sterilization certification and/or other related data.

For example, the manufacturing facility could be a produce packaging plant, and the containers 112A, 112B, etc., contain spinach leaves that are ionizing radiation sterilized, for example using gamma radiation, to kill bacteria. Tracking tags 120 can be applied to some or all of the containers prior to sterilization for dose mapping. If only some of the containers are being tagged, then they should be appropriately located for radiation dose mapping to ensure that the entire grouping of containers has received the required level of radiation. The memory storage component that is not adversely affected by ionizing radiation preferably in the form of the gamma radiation proof RF ID tag 114 allows tracking of the product lot, and the dosimeter 115 confirms that adequate radiation for sterilization was received. The dosimeter data, if read, can be written to the memory storage component or RF ID tag 114 memory.

As a second example, containers 112A, 112B, etc. hold disposable syringes, and the tracking tags 120 are strategically located on some of the containers 112A, 112B, etc stacked on a pallet to be ionizing radiation sterilized. Preferably, some of the tags are located on the top, middle and bottom containers and/or between the containers to allow the dosimeters 115 to obtain sufficient data for dose mapping. After ionizing radiation sterilization, sterilization levels or certification are written to the memory storage component or ionizing radiation proof RF ID tags 114 of the respective tracking tag assembly 120. While the individual syringes are not marked, once the boxes are shipped to a user facility, for example, a hospital, the sterilization certification or information on the container can be read and associated with syringes in the particular lot.

At the user facility, for example, a distribution center or sales center, the product can be easily tracked and sterilization data, shelf life data or other information could be read or updated, and local history databases with additional information updated in a similar manner to that described with the system 10.

Those skilled in the art will understand from the present disclosure that the tracking system 110 can be used for dose mapping of any number of items in a lot of items to be ionizing irradiated, and is of particular use in dose mapping of ionizing radiation sterilized lots of items. The items can be liners for vessels, bags, filters, medical devices, and other disposables and non-disposables or items that are to be irradiated, and preferably items to be gamma radiation sterilized where the level of radiation received needs to be tracked.

Those skilled in the art will recognize that various attachment devices and methods are usable according to the invention

What is claimed is:

1. A tracking system for gamma radiation irradiated lots of items, comprising:
    an RF ID tracking tag assembly including a rewriteable FRAM (Ferroelectric Random Access Memory) memory storage component, that is not adversely affected by gamma radiation sterilization;
    the rewriteable FRAM memory storage component including a unique identification and a memory, and at least one trackable event being writable to the memory;
    a memory reader which is usable by a user to obtain the identification from the memory storage component after it has been gamma radiation irradiated and which can read the at least one trackable event stored in the memory.

2. The tracking system of claim 1, wherein the tracking tag assembly further includes a dosimeter that records a level of gamma radiation to which the tag is exposed.

3. The tracking system of claim 2, wherein the at least one trackable event comprises at least one of a sterilization certification, a radiation level or a dosimetry record.

4. The tracking system of claim 3, wherein additional trackable events are stored in the memory including at least one of a manufacturing date, a batch number, a lot number, material specifications, material lot number, certifications for sterility, certificates of compliance, size specifications, functional specifications, description, customer data, or customer application associated with the identification.

5. The tracking system of claim 1, wherein the memory reader is a RF ID tag reader that is connectable to PC, internet accessible device or internet for communication of data to a centralized database.

6. The tracking system of claim 1, wherein the at least one trackable event includes at least one of a manufacturing date, a batch number, a lot number, material specifications, material lot number, certifications for sterility, certificates of compliance, size specifications, functional specifications, description, dosimetry records, sterilization certifications, customer data or customer application associated with the identification.

7. The tracking system of claim 3, wherein the tracking tag assembly comprises an external pouch, molded strap or laminations surrounding the RF ID tag.

8. The tracking system of claim 7, wherein the laminations comprise layers of a bag or pouch and the RF ID tag is sealed between the laminations in a seam area of the bag or pouch.

9. The tracking system of claim 3, wherein the tracking tag assembly comprises a holder formed from two pieces of laminate that are made of a polymeric material with the RF ID tag sandwiched between the laminates.

10. The tracking system of claim 1, wherein the tracking tag assembly is integrally molded onto an item to be tracked.

11. The tracking system of claim 1, further comprising a local tracking history database in which data from the memory reader can be stored and tracked for each of the items being tracked.

12. The tracking system of claim 1, further comprising a history analysis and reorder system that analyzes the local history databases to determine a shelf life of the item being tracked or its contents.

13. A method of tracking items to be gamma radiation irradiated using a tracking system, comprising,
affixing an RF ID tracking tag assembly with a rewriteable FRAM memory storage component that is not adversely effected by gamma radiation sterilization on the item to be irradiated;
subjecting the item to gamma radiation irradiation for sterilization;
writing data to the rewriteable FRAM memory storage component before or after being subjected to the gamma radiation sterilization;
providing information relating to the irradiated item to a data base correlated to an identification data which is stored in said FRAM memory storage component; and
a user reading the rewriteable FRAM memory storage component on the item with a memory reader.

14. The method of claim 13, further comprising:
the user inputting at least one trackable event regarding the gamma radiation irradiated item into the memory reader which is a memory reader/writer;
the memory reader/writer writing the information relating to the gamma radiation irradiated item or at least one trackable event regarding the irradiated item back on the rewriteable FRAM memory storage component; and
uploading data from the memory reader to a PC or an internet accessible device or connecting the memory reader to an internet;
accessing the data base;
retrieving data relating to the gamma radiation irradiated item from the data base; and
uploading data on the at least one trackable event to the data base to build the data base.

15. The method of claim 14, wherein the memory reader is an RF ID tag reader that can read the RF ID tag without physical contact therewith.

16. The method of claim 15, wherein the tracking tag assembly further includes a dosimeter that records a level of radiation; and the method further includes reading the radiation level recorded by the dosimeter; and
writing radiation level data to the RF ID tag or adding the radiation level data to the data base correlated to the RF ID tag for the item.

17. The method of claim 13, wherein the item is a bag or pouch, and the method further comprises sealing the tracking tag assembly into a seam of the bag or pouch.

18. A method of tracking gamma radiation sterilized lots of items using a tracking system, comprising:
positioning at least one tracking tag assembly including an RF ID tag with a rewriteable FRAM memory storage component that is resistant to gamma radiation sterilization and a dosimeter in a lot of items;
gamma radiation sterilizing the lot of items;
determining gamma radiation exposure using the dosimeter; and
writing sterilization data determined from the dosimeter to the RF ID tag or to a data base correlated with the RF ID tag identification.

19. The method of claim 18, further comprising:
providing a plurality of the tracking tag assemblies;
locating the tracking tag assemblies according to a set pattern or based on a predetermined map in the lot of items;
determining sterilization data from each of the dosimeters of the tracking tag assemblies to provide a dose map for the lot of items.

20. The method of claim 19, further comprising:
writing the locations of the tracking tag assemblies to the respective RF ID tags of the tracking tag assemblies.

21. The method of claim 19, further comprising:
writing the sterilization data to the respective RF ID tags of the tracking tag assemblies.

22. The method of claim 19, further comprising:
loading the location data for the tracking tag assemblies and the sterilization data to the database.

23. The method of claim 13, wherein the item comprises at least one of liners for vessels, bags, filters, medical devices, or pharmaceutical, chemical or biological processing devices.

* * * * *